(12) United States Patent
Begey et al.

(10) Patent No.: US 8,290,602 B2
(45) Date of Patent: Oct. 16, 2012

(54) ELECTRONIC SYSTEM WITH COMPONENT REDUNDANCY, AND CONTROL CHAIN FOR A MOTOR IMPLEMENTING SUCH SYSTEM

(75) Inventors: Michel Begey, Offemont (FR);
Jean-Luc Misson, Montigny sur Loing (FR)

(73) Assignee: Converteam Technology Ltd., Warwickshire (GB)

( * ) Notice: Subject to any disclaimer, the term of this patent is extended or adjusted under 35 U.S.C. 154(b) by 349 days.

(21) Appl. No.: 12/653,559

(22) Filed: Dec. 15, 2009

(65) Prior Publication Data

US 2010/0168877 A1    Jul. 1, 2010

(30) Foreign Application Priority Data

Dec. 15, 2008 (FR) ...................................... 08 58569

(51) Int. Cl.
*G06F 19/00* (2011.01)
(52) U.S. Cl. ................ 700/82; 700/54; 714/4.1; 714/10
(58) Field of Classification Search ..................... 700/54, 700/82; 714/3, 10, 4.1, 56
See application file for complete search history.

(56) References Cited

U.S. PATENT DOCUMENTS

| | | | |
|---|---|---|---|
| 4,634,110 A * | 1/1987 | Julich et al. ...................... | 714/11 |
| 4,672,529 A * | 6/1987 | Kupersmit ........................ | 700/1 |
| 5,086,499 A * | 2/1992 | Mutone ............................ | 714/3 |
| 5,107,425 A | 4/1992 | Donges et al. ............ | 364/424.03 |
| 5,838,899 A | 11/1998 | Leavitt et al. ............. | 395/185.09 |
| 7,725,635 B2 * | 5/2010 | Wei et al. ........................ | 710/244 |
| 2003/0100961 A1* | 5/2003 | Monse et al. .................... | 700/61 |
| 2008/0124073 A1 | 5/2008 | Moore et al. ....................... | 398/2 |

FOREIGN PATENT DOCUMENTS

| | | |
|---|---|---|
| EP | 0 399 308 | 11/1990 |
| FR | 2 561 410 | 9/1985 |

* cited by examiner

*Primary Examiner* — John R. Cottingham
*Assistant Examiner* — Douglas Lee
(74) *Attorney, Agent, or Firm* — Davidson, Davidson & Kappel, LLC

(57) ABSTRACT

An electronic system with component redundancy includes a first processing unit, connected to a first board, and a second processing unit redundant with respect to the first unit, and connected to a second board redundant with respect to the first board. Each processing unit and each board include a first communication port, the first communication ports of the first unit and of the first board, and, respectively, of the second unit and of the second board, being interconnected by a wired communication link. Each processing unit and each board include a second communication port, the second port of the first board being connected to the second port of the second unit by a wired communication link, and the second port of the second board being connected to the second port of the first unit by a wired communication link, each communication port able to be activated or deactivated by a corresponding software command.

10 Claims, 2 Drawing Sheets

ELECTRONIC SYSTEM WITH COMPONENT REDUNDANCY, AND CONTROL CHAIN FOR A MOTOR IMPLEMENTING SUCH SYSTEM

Priority to French Patent Application No. 0858569, filed Dec. 15, 2008 and hereby incorporated by reference herein, is claimed.

The present invention relates to an electronic system with component redundancy.

The invention relates also to a drive chain, comprising an electric motor and such a system, said system being intended to check that the motor is operating correctly.

BACKGROUND

There is known an electronic system with conventional redundancy, comprising two processing chains arranged in parallel. The first chain includes a first processing unit able to implement algorithms, and a plurality of first input/output boards connected in series with the first unit. Each first board is capable of acquiring input signals delivered by a plurality of sensors, and/or of generating output signals to control a plurality of actuators. The second chain includes a second processing unit able to implement the same algorithms as those implemented by the first unit, and a plurality of second boards connected in series with the second unit. Each second board is able to acquire the same input signals as a respective first board, and able to generate the same output signals as said respective first board. In other words, the second processing unit is functionally identical to the first processing unit, and each second board is functionally identical to a respective first board. The first processing unit and the second processing unit are interconnected by a first and a second wired communication link, the second link being redundant with respect to the first link.

However, the failure of a processing unit makes the corresponding chain totally inoperative. The failure of a board makes the corresponding chain inoperative from this failing board, for the other boards arranged downstream with respect to the processing unit arranged upstream. Such a failure of a component therefore significantly reduces the reliability of the set of two chains. Furthermore, there is a significant common mode between the two processing units, which also reduces the reliability of the set of two chains.

SUMMARY OF THE INVENTION

An object of the invention is to provide an electronic system with component redundancy, the availability and reliability of which are improved.

The present invention provides an electronic system of the above-mentioned type, characterized in that each processing unit and each board include a second communication port, in that the second port of the first board is connected to the second port of the second unit by a wired communication link, in that the second port of the second board is connected to the second port of the first unit by a wired communication link, in that each communication port can be activated by a software activation command, and in that each communication port can be deactivated by a software deactivation command.

According to other embodiments, the electronic system may include one or more of the following features, taken in isolation or in any technically possible combination:

the system includes a plurality of first boards and of second boards, the first boards being connected in series with one another so as to form a first chain of first boards, the first board arranged at the beginning of the first chain being connected to the first processing unit, and the first board arranged at the end of the first chain being connected to the second processing unit; the second boards are connected in series with one another so as to form a second chain of second boards, the second board arranged at the beginning of the second chain being connected to the second processing unit, and the second board located at the end of the second chain being connected to the first processing unit; and each second board is able to acquire the same input signals as a respective first board, the input signals being capable of being delivered by at least one sensor, and able to generate the same output signals as the respective first board, the output signals being capable of controlling at least one actuator, the first and the second boards are arranged in the same place in the first chain and in the second chain respectively, each processing unit is capable of being driven remotely via an asynchronous serial link, each communication port is a bidirectional data port, the first and the second units are not directly interconnected by a wired communication link, a wired communication link is electronically disabled when a communication port connected to one of the ends of this wired link is deactivated by the software deactivation command, a communication bus includes a single processing unit and at least one board, the processing unit and the or each board being connected in series, the bus being controlled by a single master, the master of the bus is a processing unit, and the bus topology can be configured using the software activation and deactivation commands, each wired communication link is an EtherCAT link.

The present invention also provides a drive chain, comprising an electric motor and a system for checking for correct operation, characterized in that the checking system is an electronic system as defined above.

BRIEF DESCRIPTION OF THE DRAWINGS

The invention and its advantages will become clearer from reading the following description given purely by way of example and with reference to the appended drawings in which.

DETAILED DESCRIPTION

Figure 1:
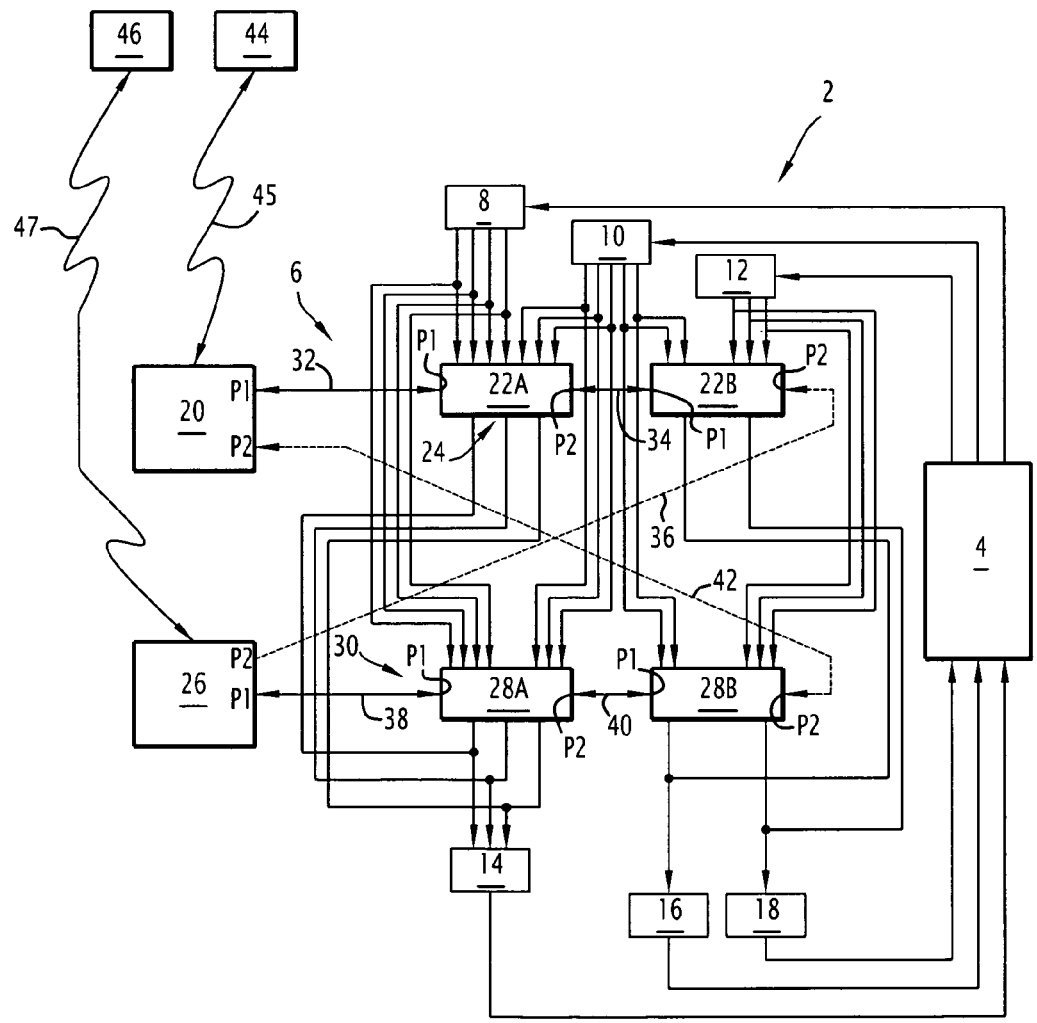
FIG. 1 is a schematic representation of a drive chain according to the invention.

In FIG. 1, a drive chain 2 comprises an electric motor 4 and an electronic system 6 for checking for and controlling the correct operation of the motor. The drive chain 2 is, for example, arranged in a sealed chamber and submerged in the sea. The motor 4 is, for example, a submarine compressor.

In the example embodiment of FIG. 1, the electric motor 4 is connected to a first sensor 8, a second sensor 10 and a third sensor 12, each being intended to measure characteristic quantities of the motor 4, such as, for example, temperature, rotational speed and rotational torque. The motor 4 is also connected to a first actuator 14, a second actuator 16 and a third actuator 18, intended to transmit excitation signals to the motor 4.

Figure 2:
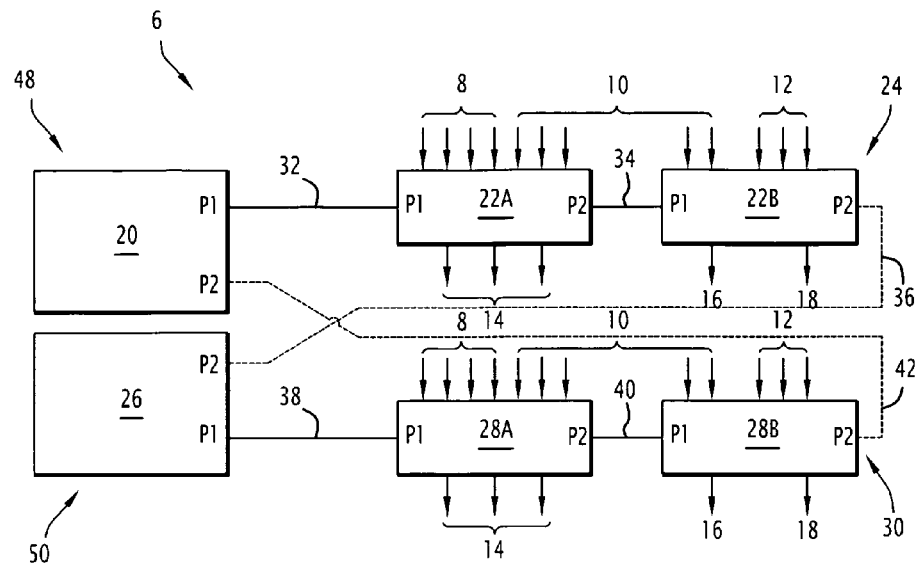
FIG. 2 is a schematic representation of an electronic system with redundancy for the control chain of FIG. 1.
Figure 3:
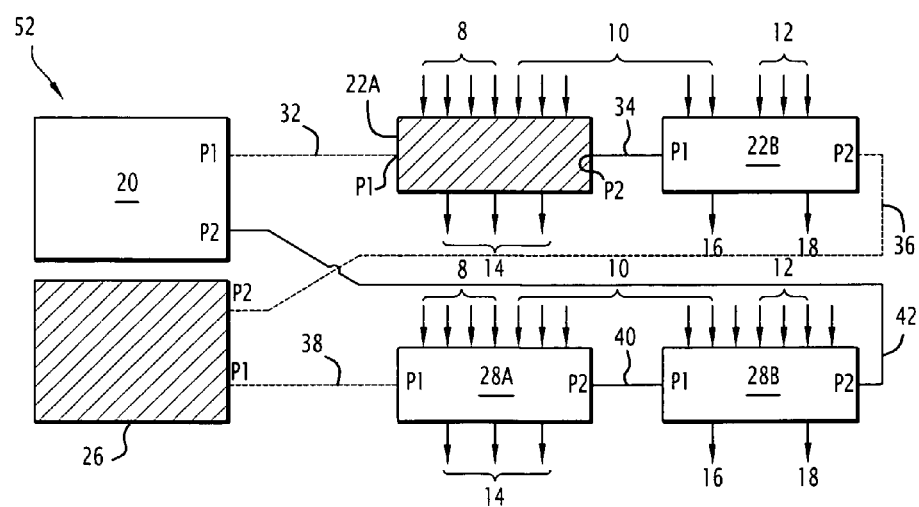
FIG. 3 is a view similar to that of FIG. 2, in the case of a failure of a processing unit and an acquisition and/or generation board.

The electronic system 6, visible in FIGS. 1 to 3, comprises the first processing unit 20 and a plurality of first boards 22A, 22B, the first boards 22A, 22B being connected in series, one to the other, for the bidirectional transmission of information, so as to form a first chain 24 of first boards.

The first unit 20 is able to implement algorithms, and each first board is intended to acquire input signals capable of being delivered by at least one sensor 8, 10, 12, and/or to generate output signals capable of controlling at least one actuator 14, 16, 18. In the example embodiment of FIG. 1, the first board 22A arranged at the beginning of the first chain 24 is capable of receiving signals from the first sensor 8 and from the second sensor 10. The first board 22B arranged at the end of the first chain 24 is capable of receiving signals from the second sensor 10 and from the third sensor 12. The beginning first board 22A is capable of generating output signals bound for the first actuator 14. The end first board 22B is capable of generating an output signal bound for the second actuator 16 and another output signal bound for the third actuator 18.

The electronic system 6 also includes a second processing unit 26 and a plurality of second boards 28A, 28B, the second boards 28A, 28B being connected in series with one another so as to form a second chain 30 of second boards.

The second unit 26 is able to implement the same algorithms as those implemented by the first unit 20. Each second board 28A, 28B is intended to acquire the same input signals as a respective first board 22A, 22B, and to generate the same output signals as the respective first board 22A, 22B. In the example embodiment of FIG. 1, the second board 28A arranged at the beginning of the second chain 30 is capable of acquiring the same input signals and of generating the same output signals as the beginning first board 22A. In other words, the beginning second board 28A is connected to the first sensor 8 and to the second sensor 10, in order to receive the signals from these sensors, and to the first actuator 14 in order to deliver the corresponding output signals to it.

The second board 28B arranged at the end of the second chain 30 is capable of acquiring the same input signals and of generating the same output signals as the end first board 22B. In other words, the end second board 28B is connected to the second sensor 10 and to the third sensor 12 in order to receive the input signals from these sensors, and to the second actuator 16 and to the third actuator 18, in order to deliver the corresponding output signal to each.

The second unit 26 is therefore functionally identical to the first unit 20, and each board 28A, 28B is functionally identical to a respective first board 22A, 22B. In other words, the second unit 26 is redundant with respect to the first unit 20, and each second board 28A, 28B is redundant with respect to a respective first board 22A, 22B.

The first and second units 20, 26 are produced using different fabrication technologies. Each first board 22A, 22B and each respective second board 28A, 28B are produced using different fabrication technologies. As a variant, the second unit 26 is strictly identical to the first unit 20, and each second board 28A, 28B is strictly identical to a respective first board 22A, 22B.

In the example embodiment of FIG. 1, the first board 22A, 22B and the respective second board 28A, 28B are arranged in the same place in the first chain 24 and in the second chain 30.

Each processing unit 20, 26 and each board 22A, 22B, 28A, 28B include a first communication port P1 and a second communication port P2.

The first port P1 of the first unit 20 is connected by a wired communication link 32 to the first port P1 of the beginning first board 22A arranged at the beginning of the first chain 24. The second port P2 of the beginning first board 22A is connected to the first port P1 of the successive first board, in this case the end first board 22B arranged at the end of the first chain 24, by another wired communication link 34. The second port P2 of the end first board 22B is connected to the second port P2 of the second unit 26 by another wired communication link 36.

The first port P1 of the second unit 26 and first port P1 of the beginning second board 28A arranged at the beginning of the second chain 30 are interconnected by another wired communication link 38. The second port P2 of the beginning second board 28A is connected to the first port P1 of the successive second board, in this case the end second board 28B arranged at the end of the second chain 30, by another wired communication link 40. The second port P2 of the end second board 28B and the second port P2 of the first unit 20 are interconnected by a last wired communication link 42.

The first unit 20 and the second unit 26 are not directly interconnected by a wired communication link.

Each communication port P1, P2 is a bidirectional data port. Each wired communication link 32 to 42 is a bidirectional data link. Each wired communication link 32 to 42 is, for example, an EtherCAT link.

The first processing unit 20 is capable of being driven remotely by a first control device 44 via a first control link 45. The second processing unit 26 is capable of being driven remotely by a second control device 46 via a second control link 47. The control links 45, 47 are, for example, wired links. The control links 45, 47 are asynchronous serial links, submerged in the sea, also called submarine modem links.

Each communication port P1, P2 can be activated by a software activation command, and deactivated by a software deactivation command. The software activation or deactivation commands are transmitted by the first or the second control device 44, 46 to the unit 20, 26 or to the corresponding board 22A, 22B, 28A, 28B via the control link 45, 47 and then the respective wired links 32 to 42. A wired communication link 32 to 42 is electronically disabled when a communication port P1, P2 connected to one of its ends is deactivated by the software deactivation command. In other words, when a communication port P1, P2 is deactivated, it is still connected by a hardware line with the corresponding communication port P1, P2, but no data is capable of being exchanged between this deactivated communication port and the communication port connected to the other end of the corresponding wired link.

The operation of the electronic system according to the invention will now be explained with the aid of FIGS. 2 and 3. FIG. 2 illustrates the operation of the system 6 in nominal mode. FIG. 3 illustrates the operation of the system 6 in a mode with failure.

In order to facilitate the reading of FIGS. 2 and 3, the links between the first boards 22A, 22B, and, respectively, between the second boards 28A, 28B, and the sensors 8, 10, 12, and, respectively, the actuators 14, 16, 18, are represented in the form of a brace with the corresponding reference of the sensor, and, respectively, of the actuator.

A communication bus implementing the EtherCAT wired links must be controlled by a single master. Since the bus master is a processing unit 20, 26, a communication bus for the electronic system 6 includes a single processing unit 20, 26 and at least one board 22A, 22B, 28A, 28B. The processing unit 20, 26 and the or each board 22A, 22B, 28A, 28B are necessarily connected in series, or cascaded, the EtherCAT communication link being a point-to-point communication link. The topology of each communication bus of the electronic system 6 can be configured using software activation and deactivation commands.

In nominal operating mode, i.e. when all the units 20, 26 and all the acquisition and/or generation boards 22A, 22B, 28A, 28B are operational, and as represented in FIG. 2, an operator acts on the first control device 44 in order to transmit to the first unit 20 the software command for deactivating its second port P2. Following the intervention by the operator, the first device 44 also transmits to the first unit 20 the software command for activating its first port P1, and then transmits in cascade to the beginning first board 22A the software commands for activating its first port P1 and its second port P2, and lastly to the end first board 22B the software commands for activating its first port P1 and its second port P2. A first communication bus 48 is hence formed by the first unit 20 and by the first boards 22A, 22B.

The operator acts in the same way on the second control device 46 in order to transmit to the second unit 26 the software command for deactivating its second port P2, and then the software command for activating its first port P1. The second device 46 then transmits successively to the beginning second board 28A the software command for activating its first port P1 and the software command for activating its second port P2, and then to the end second board 28B the software command for activating its first port P1 and the software command for activating its second port P2. A second communication bus 50 is hence formed by the second unit 26 and by the second boards 28A, 28B. The communication buses 48, 50 operate independently of one another and without exchanging data between each other, such that there is no common mode between the buses 48, 50.

In nominal operating mode, the communication links 36, 42 between the second ports P2 of the end first board 22B and of the second unit 26, and, respectively, between the second ports P2 of the end second board 28B and of the first unit 20, are electronically disabled (represented in dotted line). The other wired communication links 32, 34, 38 and 40 are active (represented in solid line).

FIG. 3 illustrates the case of a failure of the second processing unit 26 and of the beginning first board 22A, which are represented with hatching.

It is moreover to be noted that, in such a failure case, a conventional redundant system would be totally inoperative, since the transmission of information in the first chain would be cut from the beginning with the failure of the board arranged at the beginning of the first chain, and that the second chain would also be inoperative due to the failure of the second processing unit.

With the electronic system according to the invention, when the operator detects such a failure of the second unit 26 and of the beginning first board 22A, the operator acts on the first device 44 in order to transmit successively to the first unit 20 the software command for deactivating its first port P1 and then the software command for activating its second port P2. The communication link 32 between the first unit 20 and the beginning first board 22A is hence electronically disabled (represented in dotted line), and the communication link 42 between the first unit 20 and the end second board 28B is active and operational (represented in solid line). A communication bus 52 is hence formed by the first unit 20, the end second board 28B and the beginning second board 28A.

At this instant, each communication port P1, P2 of the end second board 28B and of the beginning second board 28A is still active. In order to be sure that the failing second unit 26 will not interfere with the communication bus 52, the operator acts on the first device 44 in order to transmit to the beginning second board 28A the software command for deactivating its first port P1. The communication link 38 between the second unit 26 and the beginning second board 28A is hence electronically disabled (represented in dotted line).

The communication bus 52, which is software- and "cold-" reconfigured, i.e. following human intervention, thus enables an electronic system for checking for the correct operation of a motor to be proposed, which remains operational despite the failure of the second unit 26 and of the beginning first board 22A.

In general, when the operator detects a failure of one of the components of the electronic system 6, through the first device 44 or the second device 46, the operator will attempt to cold-reconfigure, using software activation and deactivation commands, a communication bus which includes a single processing unit and all the boards of one of the two chains 24, 30, the unit and the boards being operational. If at least one processing unit and at least all the boards of a chain 24, 30 are not operational, the operator will cold-reconfigure a communication bus which includes one operational processing unit 20, 26 and at least one operational acquisition and/or generation board.

It is thus understood that the electronic system according to the invention exhibits markedly improved maintenance and reliability characteristics. More specifically, by reconfiguring the electronic system, correct operation of the system can be ensured despite the failure of some of its components. Furthermore, there is no common mode between the first unit 20 and the second unit 26, since the units 20, 26 are not interconnected, thereby also improving the reliability of the electronic system 6.

As a variant, the electronic system 6 includes only one first board 22 and only one second board 28.

As a variant, the electronic system 6 includes a plurality of first boards and a plurality of second boards, the number of first boards being identical to the number of second boards, and greater than or equal to three.

As a variant, the first processing unit 20 and the second processing unit 26 are capable of being controlled remotely by only one control device, the data between the control device and the first unit 20 on the one hand, and the second unit 26 on the other hand, being transmitted successively and without a common mode between the first unit 20 and the second unit 26. The remote control of the two processing units 20, 26 by a single control device has no impact on the reliability of the electronic system according to the invention, since the control device, external to the electronic system, is accessible and easily exchangeable in the event of failure.

As a variant, the control links 45, 47 are wireless links, for example radio links.

What is claimed is:

1. An electronic system with component redundancy, comprising:
    a first processing unit, able to implement algorithms, connected to a first board for acquiring input signals that are capable of being delivered by at least one sensor, and/or for generating output signals that are capable of controlling at least one actuator,
    a second processing unit able to implement the same algorithms as those implemented by the first unit, and which is connected to a second board for acquiring the same input signals that are capable of being delivered by the sensor as those received by the first board and/or for generating the same output signals that are capable of controlling the actuator as those generated by the first board, each processing unit and each board including a first communication port, the first communication ports of the first unit and of the first board, and, respectively, of the second unit and of the second board, being interconnected by a wired communication link, wherein in that each processing unit and each board include a second communication port, in that the second port of the first board is connected to the second port of the second unit by a wired communication link, in that the second port of the second board is connected to the second port of the first unit by a wired communication link, wherein each communication port can be activated by a software activation command, and wherein each communication port can be deactivated by a software deactivation command;

wherein the first and the second units are not directly interconnected by a wired communication link.

2. A system according to claim 1, wherein each processing unit is capable of being driven remotely via an asynchronous serial link.

3. A system according to claim 1, wherein each communication port is a bidirectional data port.

4. A system according to claim 1, wherein a wired communication link is electronically disabled when a communication port connected to one of the ends of this wired link is deactivated by the software deactivation command.

5. A system according to claim 1, wherein a communication bus includes a single processing unit and at least one board, the single processing unit and the at least one board being connected in series, the bus being controlled by a single master.

6. A system according to claim 5, wherein the master of the bus is a processing unit, and wherein the bus topology can be configured using the software activation and deactivation commands.

7. A system according to claim 1, wherein each wired communication link is an EtherCAT link.

8. A drive chain, comprising an electric motor and a system for checking that the motor is operating correctly, wherein the system is in accordance with claim 1.

9. An electronic system with component redundancy, comprising:

a first processing unit, able to implement algorithms, connected to a first board for acquiring input signals that are capable of being delivered by at least one sensor, and/or for generating output signals that are capable of controlling at least one actuator, a second processing unit able to implement the same algorithms as those implemented by the first unit, and which is connected to a second board for acquiring the same input signals that are capable of being delivered by the sensor as those received by the first board and/or for generating the same output signals that are capable of controlling the actuator as those generated by the first board, each processing unit and each board including a first communication port, the first communication ports of the first unit and of the first board, and, respectively, of the second unit and of the second board, being interconnected by a wired communication link, wherein in that each processing unit and each board include a second communication port, in that the second port of the first board is connected to the second port of the second unit by a wired communication link, in that the second port of the second board is connected to the second port of the first unit by a wired communication link, wherein each communication port can be activated by a software activation command, and wherein each communication port can be deactivated by a software deactivation command;

the system including a plurality of first boards and of second boards, the first boards being connected in series with one another so as to form a first chain of first boards, the first board arranged at the beginning of the first chain being connected to the first processing unit, and the first board arranged at the end of the first chain being connected to the second processing unit, in that the second boards are connected in series with one another so as to form a second chain of second boards, the second board arranged at the beginning of the second chain being connected to the second processing unit, and the second board located at the end of the second chain being connected to the first processing unit, and in that each second board is able to acquire the same input signals as a respective first board, the input signals being capable of being delivered by at least one sensor, and able to generate the same output signals as the respective first board, the output signals being capable of controlling at least one actuator.

10. A system according to claim 9, wherein the first and the second boards are arranged in the same place in the first chain and in the second chain respectively.

* * * * *